Oct. 27, 1925.

C. W. CARTER

FEED REGULATOR

Filed Nov. 26, 1923

Inventor
Clarence W. Carter
By his Attorneys

Oct. 27, 1925.

C. W. CARTER 1,558,668

FEED REGULATOR

Filed Nov. 26, 1923

Inventor
Clarence W. Carter
By his Attorneys

Oct. 27, 1925.    1,558,668
C. W. CARTER
FEED REGULATOR
Filed Nov. 26, 1923    6 Sheets-Sheet 4

Inventor
Clarence W. Carter
By his Attorneys

Oct. 27, 1925.

C. W. CARTER 1,558,668

FEED REGULATOR

Filed Nov. 26, 1923     6 Sheets-Sheet 6

Fig.9

Inventor
Clarence W. Carter
By his Attorneys

Patented Oct. 27, 1925.

1,558,668

UNITED STATES PATENT OFFICE.

CLARENCE W. CARTER, OF MINNEAPOLIS, MINNESOTA, ASSIGNOR TO CARTER-MAYHEW MANUFACTURING COMPANY, OF MINNEAPOLIS, MINNESOTA.

FEED REGULATOR.

Application filed November 26, 1923. Serial No. 677,198.

*To all whom it may concern:*

Be it known that I, CLARENCE W. CARTER, a citizen of the United States, residing at Minneapolis, in the county of Hennepin and State of Minnesota, have invented certain new and useful Improvements in Feed Regulators; and I do hereby declare the following to be a full, clear, and exact description of the invention, such as will enable others skilled in the art to which it appertains to make and use the same.

My invention provides an extremely simple and highly efficient machine for automatically regulating and maintaining a flow of grain or other materials on a basis that may be calculated and predetermined in unit of weight per unit of time.

Generally stated, the invention consists of the novel devices and combinations of devices hereinafter described and defined in the claims.

The regulation of the feed in this improved machine is controlled by impact produced by the falling grain or material, as distinguished from a machine in which the control is produced by the weight of accumulated grain or material. More definitely stated, the control of the feed regulation is accomplished by impact produced by material falling a predetermined distance and as the fall is practically constant, the force of the impact will be varied by two other conditions, namely, the variation in the quantity of the falling material and in the specific gravity thereof. From this, it directly follows that the machine may be set for a predetermined flow or feed of material calculated in weight per unit of time. For example, the machine may be set to feed two thousand pounds per hour and if the specific gravity of the material varies, the bulk of the flow will be automatically varied to maintain the predetermined weight.

Hitherto, feed regulators have employed a gate to regulate the flow of material and have provided an impact blade or element subject to the flowing grain and having connections for directly actuating the gate, but in such an arrangement, the action cannot be made very sensitive nor the regulation made extremely accurate because of the power absorbed in actually moving the gate, and, moreover, such an arrangement could not be used in a large machine for the regulation of large gates requiring considerable power to move them. As an important feature of my present invention, I provide power-operated means for moving the gate, combined with a very sensitive and easily actuated controller, which, in turn, is actuated by the impact-receiving device.

For convenience in description, the improved machine, the commercial form of which is hereinafter described, may be said to comprise the following important devices, to wit: a supply hopper, a control gate, a counterweighted scale beam, an impact plate having a connection to said scale beam for moving the same, a reversible power-driven gate-actuating device, and a gate-actuator reversing-device operated by the scale beam and directly controlled by movements of said impact plate.

A further consideration of the important features involved in this invention will be more readily understood after first considering more in detail the nature of the commercial machine illustrated in the accompanying drawings, wherein like characters indicate like parts throughout the several views.

Referring to the drawings.

The present commercial form of the machine is illustrated in Figs. 1 to 6, inclusive, and the structure of these views will first be described.

The machine has a housing that may take various forms but which, as shown, is made up of cast side plates 9 and various transverse sheet metal plates, and comprises a hopper compartment 10, a discharge compartment 11, and a fulcrum compartment 12. A supply spout 13 delivers to the hopper compartment 10 and a discharge spout 14 leads downward from the discharge compartment 11. The compartment 11 is shown as provided with a hinged cover 15.

The hopper compartment 10 is of somewhat peculiar form, in that it is provided with one inclined side and a flat bottom, but is open at its other side, except that the discharge therefrom is controlled by an adjustable gate. This gate 16 is in the form of an obliquely set plate arranged to slide adjacent to and above the flat bottom of the hopper in guideways 17 formed on the side plates 9 of the housing. The upper edge of the gate 16 has an outturned flange 16', for a purpose which will hereinafter appear.

Figure 3:
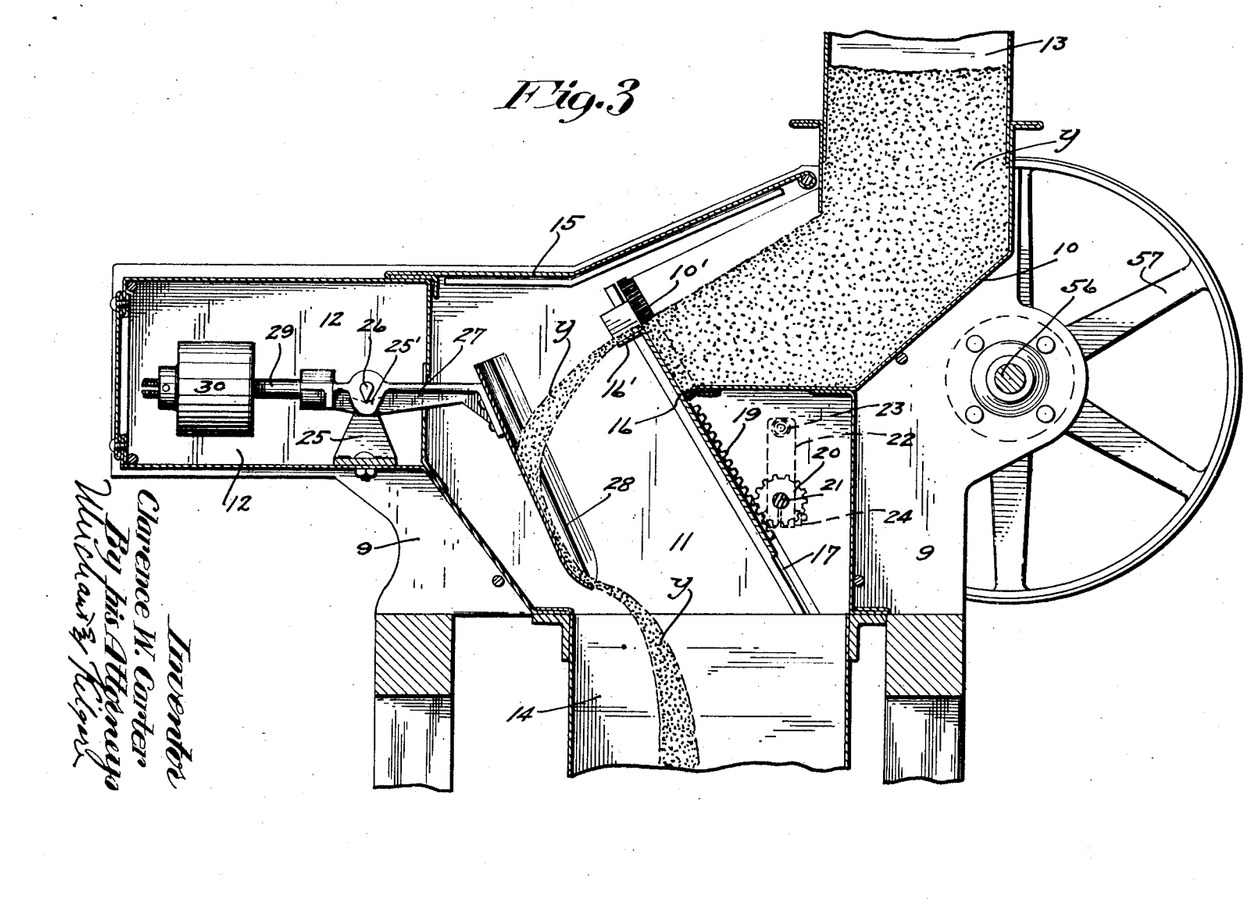
Fig. 3 is a vertical section taken approximately on the line 3—3 of Fig. 2.
Figure 4:
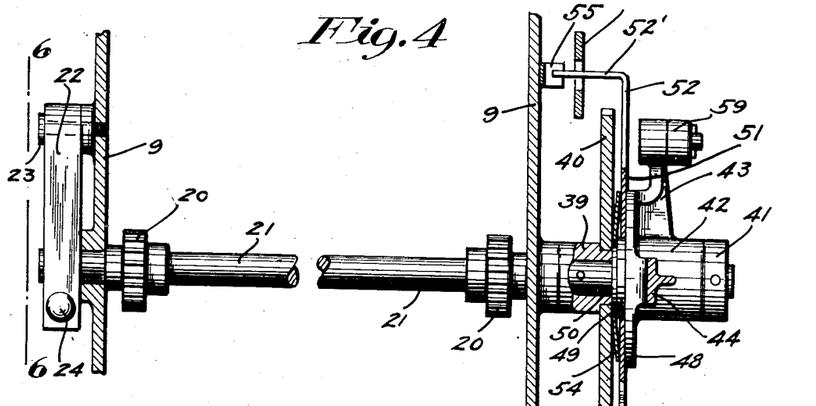
Fig. 4 is a fragmentary vertical section taken approximately on the line 4—4 of Fig. 1.

For convenience of description, the material being fed will be assumed to be wheat, indicated by the character $y$ in Fig. 3. To form a close joint between the gate and the discharge edge of the hopper, the latter is shown as provided with a brush-like edge portion 10', (see particularly Figs. 2 and 3). The gate, on its lower back portion, is provided with one or more rows of rack teeth 19 that are in mesh with a cooperating pinion or pinions 20 carried by a transverse shaft 21 extended through and journaled in the side plates 9. One end of the shaft 21 is frictionally clamped between the split end of a friction device which may be in the form of a piece of wood 22 anchored to the adjacent side plate 9 by a pin 23 and provided with a nut-equipped bolt 24 at its split end for setting the friction thereof on the shaft 21, so that said shaft will not be accidentally rotated by the weight of the gate.

Located within the compartment 12 and anchored with the bottom thereof is a fulcrum bracket 25 that has transversely spaced V-shaped knife-edged seats 25' on which rest the knife-edged fulcrums 26 of a rocking lever 27. This lever 27, as shown, is a U-shaped member to which the knife-edged fulcrums 26 are rigidly secured and to the forwardly projecting ends of which is attached the impact plate 28. This impact plate 28 is obliquely set in such position that the grain discharged from the hopper over the upper edge of the gate will be directed against the same and, preferably, it has a flanged lower edge, flanged sides and a central ridge, which latter causes the stream of grain to spread and prevents the same from concentrating too much on the central portion of the plate. A threaded rod 29 is secured to and extends rearward from the lever 27 and, in fact, constitutes a part thereof and is provided with an adjustable counterbalancing weight 30. At one side, the lever 27 is provided with a projection terminating in a disk-like portion 31 that works loosely in an opening in the side plate 9 and to which is rigidly secured a forked arm 32.

A substantially horizontal graduated scale beam 33, near one end, is rigidly secured to the forked arm 32, so that it partakes of the common oscillatory or angular movements of the lever 27 and impact plate 28. On this scale beam is a slidably adjustable weight 34. At its projected free end, the scale beam 33 is shown as provided with a reduced end 33' that works through a notch 34 in a stop flange 35 rigidly but adjustably secured to the adjacent side plate 9 by slot and screw connections 36, (see Fig. 1). The notch 34 is long enough to permit only slight vertical oscillatory movements of the scale beam 33. The scale beam 33, as will hereinafter appear, serves as a lever or beam that carries the controlling member of the gate-actuator reversing-device, and to prevent said beam from being vibrated too rapidly, its extension 33' is shown as connected to the stem of the piston 37, the head of which works in an oil-containing dash pot 38 anchored to the adjacent side plate 9.

The shaft 21 projects through the front plate 9 and secured thereon by a pin or otherwise is a hub 39 to which is rigidly secured a ratchet wheel 40, the teeth of which are beveled in both directions. Mounted to oscillate on the same end of the shaft 21 between said ratchet wheel and a fixed collar 41 is a hub 42 provided with two radially projecting arms 43 and 44, the latter of which, at its outer end, is bifurcated and carries two reversely acting driving dogs 45 and 46. The dogs 45 and 46 are shown as connected by a coiled spring 47 that tends to render the said dogs operative on the teeth of the ratchet wheel 40.

The hub 42 has a disk-like friction flange 48 and reduced bearing surfaces 49 and 50. For alternately throwing the reversely acting driving dogs 45 and 46 into action, I provide a dog-reversing device, which, as shown, comprises a disk 51 with a radially projecting escapement arm 52 and with a radially projecting dog-releasing segment 53, which latter has a central dog-releasing notch 53', (see Figs. 1, 4 and 5). The disk 51 is mounted directly on the bearing surface 49 and is spring-pressed into frictional engagement with the friction flange 48 of the oscillatory hub 42 by a large dished spring washer 54 seated on the bearing surface 50, which latter is upset so as to anchor said washer to the hub 42. The escapement arm 52 has a laterally bent end 52', (see Fig. 4), that is engageable with spaced stops 55 secured on the adjacent plate 9, (see Fig. 5). These stops 55 limit the oscillatory movements of the dog-releasing device made up of the disk 51, arm 52, and dog-releasing segment 53, as will hereinafter more fully appear in the description of the operation. Also, by reference to Fig. 5, it will be noted that the ratchet wheel 40 has a blank or toothless peripheral segment 40', the important function of which will also appear in the description of the operation.

The power device that is relied upon to actually move the gate may take various forms but, as shown, comprises a countershaft 56 journaled in suitable bearings on the side plates 9 equipped with a pulley 57 at one end and provided at its other end with a crank 58, which latter is connected by a link 59 to the arm 43 of the oscillatory dog carrier already described. A power-driven belt, not shown, will run over the pulley 57.

The mechanism herein classified as the gate-actuator-reversing device includes the dog-reversing device above described and a pair of reversely acting escapement stops which, in the machine described, act directly upon the offset end 52' of the dog-reversing arm 52 and are themselves directly carried by the scale beam 33, which latter, as already stated, carries the controlling elements of said reversing device. These so-called stops 60 and 61, in respect to the offset end 52' of the arm 52, are spaced from each other both vertically and in the direction of oscillation of said arm and they are advisably formed on a common plate 62 which has a large clearance notch 63 for the end 52' of said arm 52. There is a very intimate and peculiar relation between the various described parts of the gate actuator and of the gate-actuator reversing-device, which can be best made clear in the description of the operation presently to be given.

As a feature additional to those already described, I advisably employ an alarm device for indicating when the gate has been moved to an extreme position, either open or closed. As shown, this alarm device comprises an electric circuit 64 including a battery or source of electrical energy 65 and an electrically actuated gong 66, one lead of said circuit being grounded through the metallic parts of the machine and the other being connected to an insulated contact 67 supported on one of the plates 9 with its free end spaced from but overlapping the outer face of the ratchet wheel 40. The ratchet wheel 40 carries a metallic lug 68, which, when said ratchet wheel is rotated to a position that will carry the gate to either extreme position, will engage the contact 67 and close the circuit 64 to thereby sound the alarm device.

Figure 7:
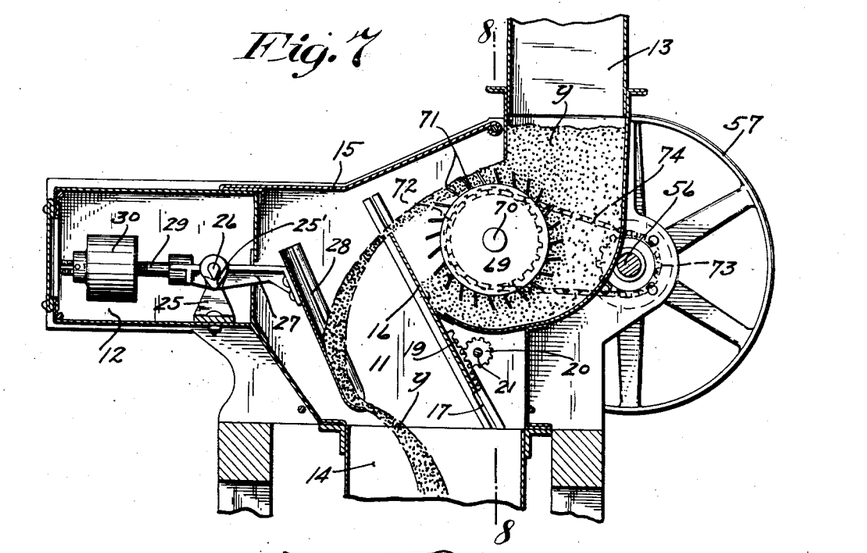
Fig. 7 is a view corresponding to Fig. 3, but illustrating a somewhat modified construction.
Figure 8:
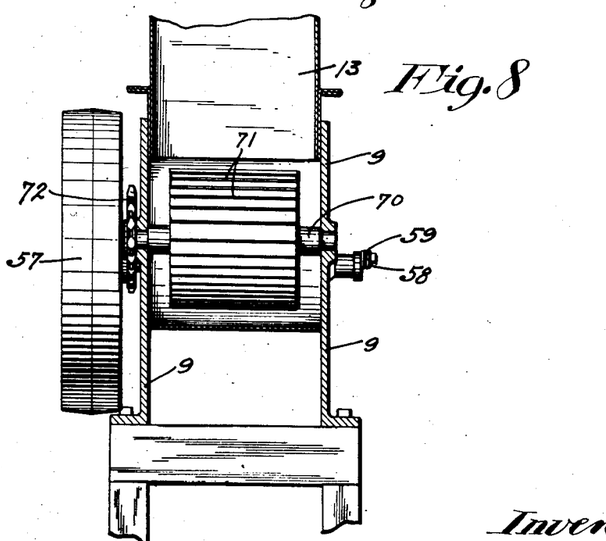
Fig. 8 is a transverse vertical section taken approximately on the line 8—8 of Fig. 7, some parts being shown in full.

The structure illustrated in Figs. 7 and 8 is like that already described, but I have added thereto a grain or material agitating device in the form of a drum 69 secured to a shaft 70 and provided with peripheral feed blades 71. The shaft 70 is journaled in the side plates 9 and at one end has a sprocket 72 over which and a sprocket 73 on the shaft 56 runs a sprocket chain 74. The drum 69 runs in an anti-clockwise direction in respect to Fig. 7 and not only keeps the grain or materials stirred up, but assists gravity in carrying the stock over the top of the feed gate. A feed device such as this blade-equipped drum will be found desirable when feeding finely ground stock or materials, such as flour and the like, which do not always flow evenly under the action of gravity and, hence, have no well-defined angle of repose.

Operation.

Figure 1:
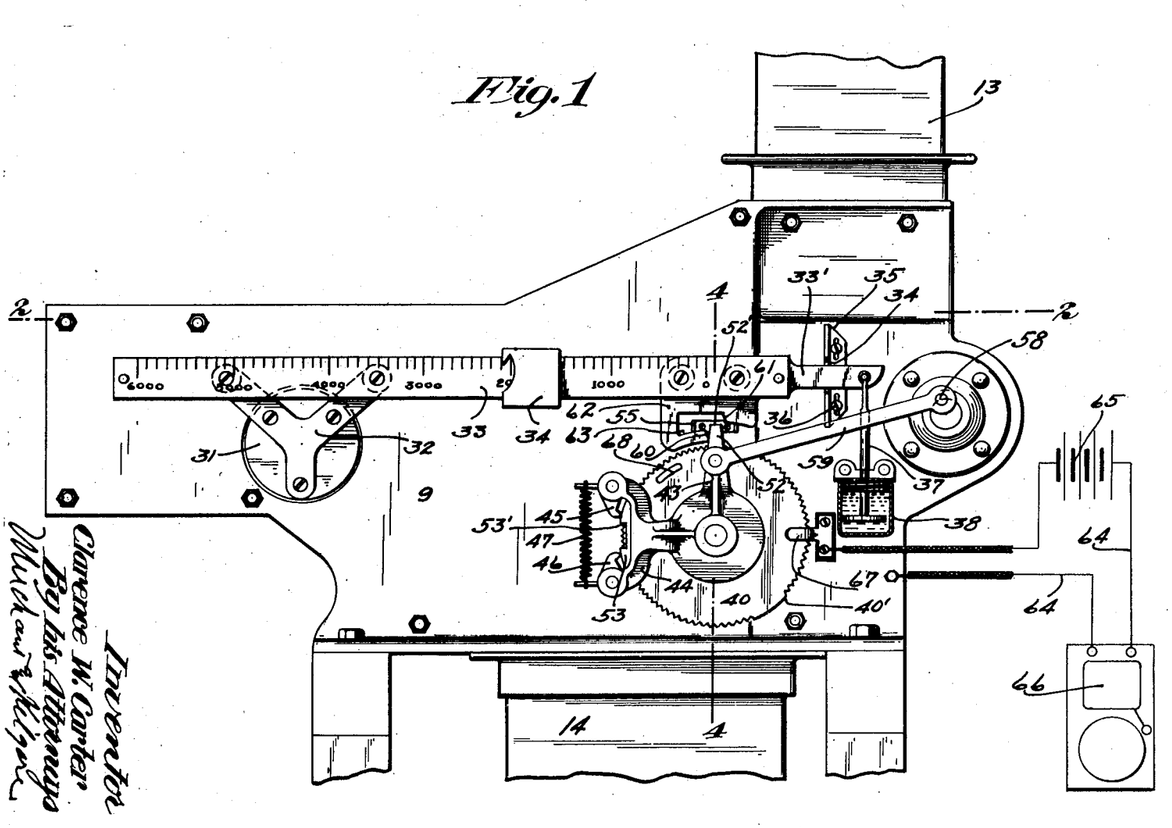
Fig. 1 is a side elevation of the improved machine, some parts being shown in section and some being diagrammatically illustrated.
Figure 2:
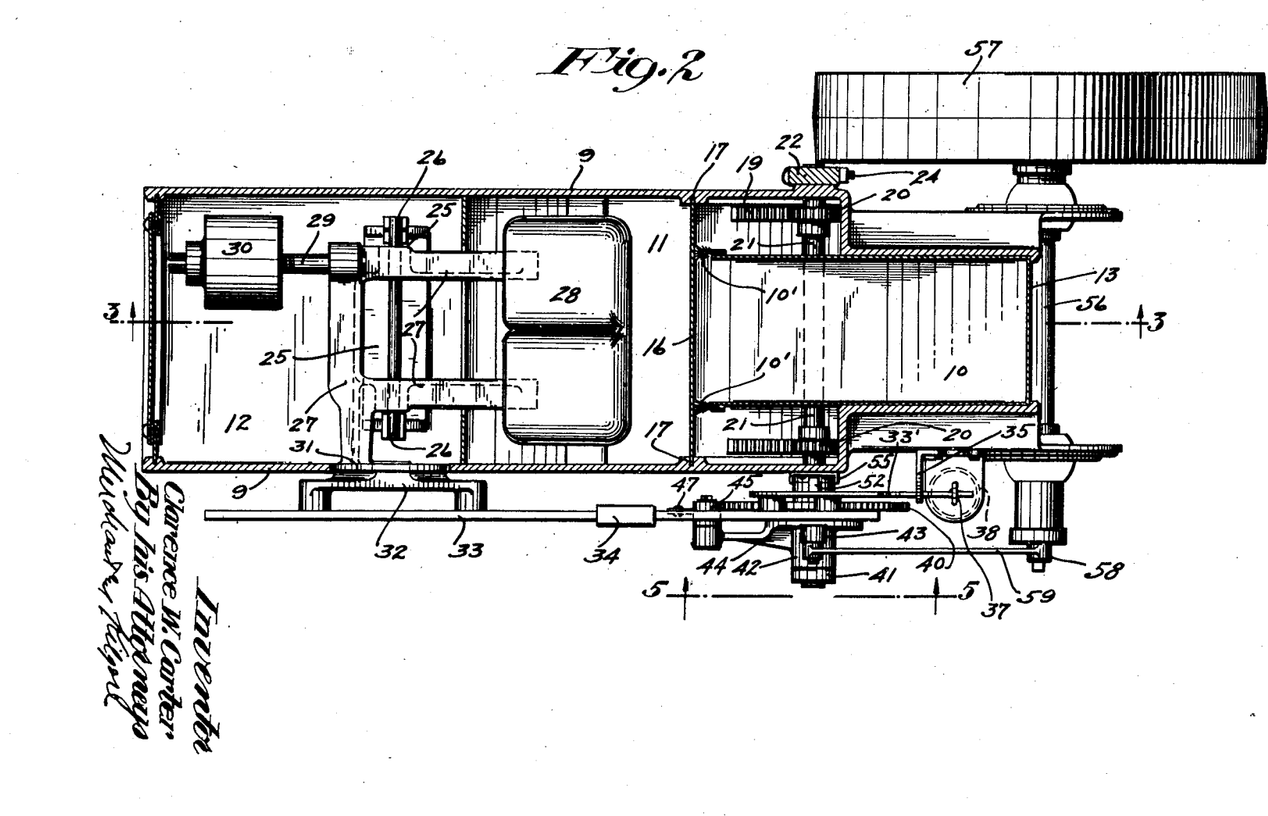
Fig. 2 is a horizontal section taken approximately on the line 2—2 of Fig. 1.

In the machine illustrated in Figs. 1 to 6, inclusive, the flow of the grain or material from the hopper will take place under the action of gravity whenever the upper edge of the gate is adjusted below the angle of repose of such material. The grain overflowing the upper edge of the gate will be directed against the impact plate 28 and here it may be noted that the flange 16' assists in giving the grain a forward projection so that it will fall on a downward curve substantially as indicated in Fig. 3 and, hence, will strike the impact plate 28 at an angle to a perpendicular. Of course, the quantity of grain that will flow from the hopper will depend upon the distance that the upper edge of the gate is adjusted below the angle of repose of the grain in the hopper; and here it may be stated that the quantity of the flow of grain will be determined by the adjustment of the weight 34 on the scale beam 33. In practice, the scale beam will preferably be graduated, so that the adjustments of the weight 34 thereon will set the gate for a flow of grain (or other material) in units of weight per hour. For instance, as shown in Fig. 1, said scale beam is marked to indicate grain flows of one thousand, two thousand, three thousand, four thousand, five thousand, and six thousand pounds per hour, and is graduated to indicate fractions of such flows. When the weight 34 is set at the zero mark at the extreme right on the scale beam 33, the impact plate 38, by the said weight and scale beam and the weight 30, will be counterbalanced. When the weight 34 is set at the one thousand pound mark, the impact blade 28 and the scale beam 33 will be counterbalanced when and only when the grain is flowing from the hopper at the rate of one thousand pounds per hour and is thereby producing on the said blade the impact produced by that certain flow of grain. A similar statement is true in respect to the conditions produced by setting of the weight 34 in any and all positions within the range of flow adjustment provided for on the scale beam.

The scale beam in the position above referred to as "counterbalanced", positions the escapement stops 60 and 61, so that the laterally bent end 52' of the escapement arm 52 will then vibrate freely below the stop 61 and above the stop 60, or, in other words, between the two stops, and there will then be no adjustment of the gate, for reasons that will presently be particularly described; and this, as is obvious, is a desired action, for, when the gate is set for exactly the predetermined desired flow, then no adjustment is required. As a matter of fact, however, the gate will require almost continuous adjustments to maintain the predetermined flow in units of weight per time, for the normal flow of grain down its angle of repose under the action of gravity will be influenced and changed by all sorts of conditions, such as the varying dampness, varying size, varying amount of oats or foreign material commingled with wheat or the like, etc. Moreover, even a piece of straw caught at the edge of the gate will retard the flow perceptibly and the lodgement of a larger object, such as a stick or piece of wood, against the edge of the gate will slow up the flow very materially unless the gate be immediately adjusted by the appropriate opening movement and this condition is one that is automatically taken care of in a manner presently described.

Figures 5, 6:
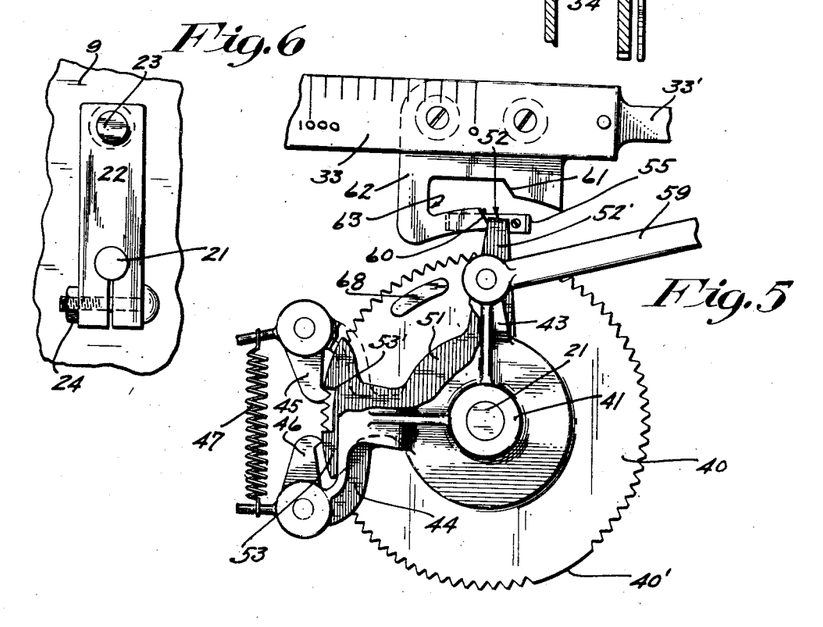
Fig. 5 is a fragmentary view in elevation showing certain parts found in the vicinity of the line marked 5—5 on Fig. 2, some parts being broken away.
Fig. 6 is a detail showing certain parts found in the vicinity of the line marked 6—6 on Fig. 4.

Attention is now called to the fact that under the action of the crank 58 and link 59, the oscillatory dog carrier, with its reversely acting dogs, will keep up a constant even movement and the dog-reversing device, which includes the notch segment 53, will, by the friction washers 54, be caused to partake of the oscillatory movements of said dog carrier except when its arm 52 is intercepted. It should be here noted that the fixed stops 55 are so spaced that they permit the offsetting arm end 52' and, hence, the dog-releasing segment 53, to partake of the full oscillatory movements of the dog carrier when and only when in neutral position, to wit: in a position to hold both dogs 45 and 46 out of action, as shown in Fig. 1. This is the reason that, when the scale beam is counterbalanced as above described and the offset arm end 52' moves freely above the escapement stop 60 and below the escapement stop 61, there will be no movement of the gate. When, however, the scale beam, because of a slight variation from the predetermined set flow, moves either upward or downward from its counterbalanced position, appropriate adjustment of the gate to correct the flow will immediately take place. For instance, if the flow is slightly decreased from the flow predetermined by setting of the weight 34, then the impact on the blade 28 will be slightly decreased and the escapement stop 60 will be raised into the path of movement of the arm end 52' and the dog-reversing segment 53 will be shifted, as shown in Fig. 5, so that its notch 53' will then permit the upper dog 45 to engage the teeth of the ratchet wheel 40 and, operating on the latter, will lower the gate an amount represented by one tooth of movement of the said ratchet wheel. On the backward vibration, however, the arm end 52' will strike the right-hand stop 55 and the segment 53 will be restored to its neutral position, thereby again throwing both dogs out of action, but if, on the next oscillatory movement of the dog carrier toward the left in respect to Fig. 5, the slight adjustment given to the gate has not sufficiently increased the flow, then the arm end 52' will again strike the stop 60, and further opening movement of the gate, represented by another tooth of movement of the ratchet wheel 40, will be produced, and this action will be repeated until the proper correction in flow has been made and, thereupon, the scale beam will be again counterbalanced by the increasing impact on the blade 28 and further opening of the gate will be stopped.

Whenever there is a flow of grain slightly in excess of the predetermined set flow, then the plate 28 will be slightly depressed, thereby carrying the escapement stop 61 into the path of movement of the arm end 52' and an upward adjustment of the gate will then be produced, by an action such as just described, except that it will then be the dog 46 that is thrown into action and which will then rotate the ratchet wheel 40 in a direction reverse to that previously described and in a direction to raise the gate. These actions, as is obvious, will take place in the proper order and as frequently as required to keep the flow of grain for all intents and purposes constant, measured in weight per unit of time, and for any flow predetermined by the setting of the weight 34 on the scale beam 33.

The stops 55, which set the dog-releasing segment in neutral position at each oscillation, prevent a repetition of the gate-adjusting movements, unless, after having made one small adjustment, further adjustment is found necessary. Otherwise stated, the gate-adjusting mechanism makes a small correcting adjustment of the gate and then stops and tries out this adjustment before making further adjustment in the same direction; but these actions are repeated so rapidly that the try-out adjustment is scarcely perceptible to an observer, although it actually takes place. The said stops 55, by the above noted action, accomplish another important result, to wit: for each oscillation, they automatically set the arm end 52′ in such position that the escapement stops 60 and 61 will clear the same and be free to move into intercepting positions, thus preventing the said arm end from interfering with the free vertical oscillatory movements of the scale beam and of the said escapement stops. The stops 35 permit but very slight vertical movements of the scale beam and escapement stops, but only such slight movements are required to set either of the said escapement stops in intercepting or operative positions, and this adds to the sensitivenes of the adjusting action.

It follows from the action above described that if the hopper should be emptied of grain, the impact against the impact plate 28 would be entirely stopped and that the automatic mechanism, in its impossible attempt to produce a flow of grain, would continue the lowering movement of the gate until it reached its extreme lower or open position and, except for a provision herein made, would even then continue its attempt to further open the gate. However, in the arrangement illustrated, the blank or toothless surface 40′ of the ratchet wheel 40, whenever the gate reaches the above noted extreme open position or, in fact, either extreme position, is moved into engagement with the operated ends of the driving dogs 45 and 46 and entirely throws the operative dog out of action and holds both dogs inoperative. At the same time, the contact 68, by engagement with the contact 67, closes the electric circuit 64 and throws the alarm gong 66 into action.

The feed regulator above described is so sensitive that, for example, in feeding wheat mixed with more or less oats, the gate will be adjusted to compensate for varying weight of different parts of the mixture, which contain different percentages of wheat and oats. When the normal flow of grain from the hopper has been temporarily deranged by a block of wood, for example, lodged against the edge of the gate, the automatic control mechanism will move the gate downward to maintain a proper predetermined flow until finally the block will be carried over the gate and then, for an instant, there will, of course, be an excessive flow, which, however, will be quickly corrected by the automatic control mechanism, which, by a very rapid action, moves the gate again upward to a place where it will again maintain the predetermined flow. The fact that such obstructions as blocks of wood will clear themselves of the gate and pass through the feeder without doing any damage thereto is also a highly important feature and is due to the fact that the hopper discharges at one side over the top of the gate rather than between the cooperating rollers or the like or through an orifice in the bottom of the hopper.

As already stated, for the feeding of finely ground materials, such as flour, middlings and the like, which have such cohesion that they do not have a well defined or definite angle of repose or flow-line, a positive agitating or feeding device, such as the rotating drum illustrated in Figs. 7 and 8, will be found desirable. Hence, it is evident that this feed device, by very slight modifications, may be adapted for feeding all kinds of material or substances that are capable of flowing under the action of gravity or of being delivered in a predetermined stream against an impact-receiving device, which latter device, for convenience, is herein designated as an impact plate.

All of the statements herein made are based on actual use of the machine.

The term "hopper" is herein used in a sense broad enough to include any kind of a receptacle for containing grain or other material to be fed. The term "gate" is used to include any kind of a device for controlling the discharge of the material from the hopper. The term "power device" is broadly used to include any means operating under a force other than that produced by the flow of the grain or material from the hopper. Broadly considered, the "gate actuator" is the device or means that applies the force of the power device to move the gate. The term "gate-actuator-reversing-device" is a broad expression for the means which, under the control of the impact plate or device and of the weighted scale beam, causes the gate actuator to move in the one direction or the other, as required to increase or decrease the flow of the material from the hopper. The term "scale beam" is also used in a liberal sense to include a lever or the like capable of variable action to set the feed device for a greater or less flow of material from the hopper.

Figure 9:
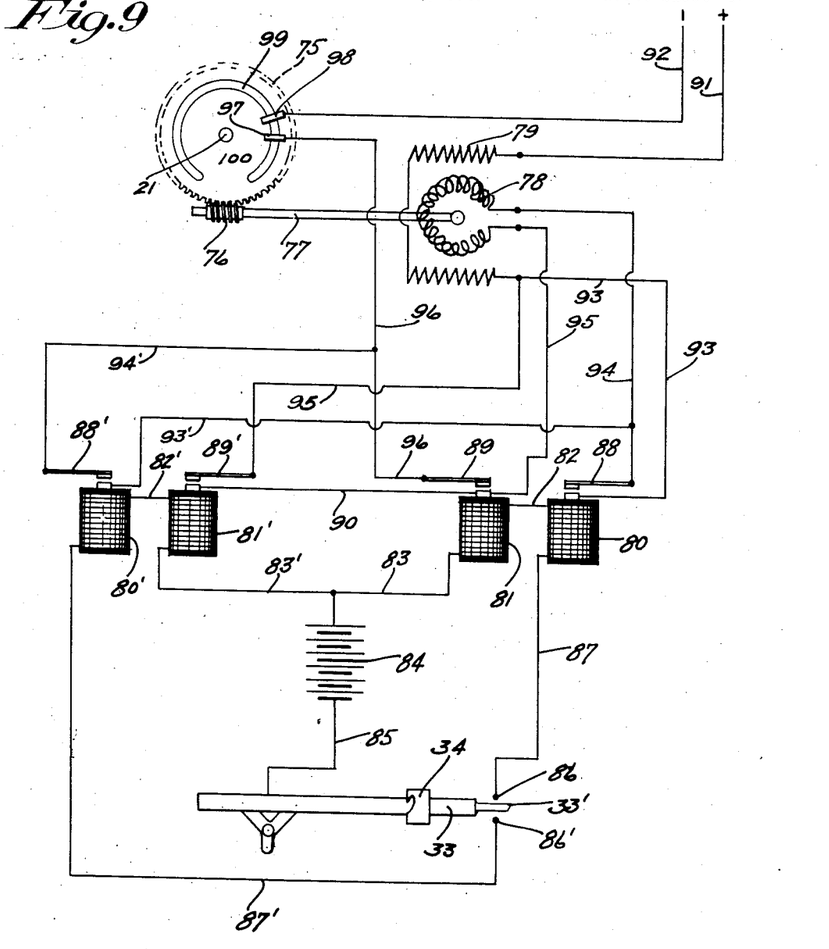
Fig. 9 is a diagrammatic view illustrating a modification of the invention wherein electrical devices are employed.

In the modification illustrated in Fig. 9, a reversible electric motor is used as the power device, the gate actuator includes a worm and worm gear, and the gate-actuator reversing-device includes magnetically actuated motor-circuit-controlling switches and magnet selecting circuits controlled by the scale beam. In this arrangement, the shaft 21 may be assumed to be the shaft previously described provided with the pinions 20 operating the gate as before described; and the scale beam 33 may be assumed to be the scale beam already before described operated by the impact plate in the manner indicated. In this arrangement, however, the shaft 21, in lieu of the ratchet wheel 40, is provided with a worm gear 75 that is driven by a worm 76 carried by a shaft 77 of the rotor or armature 78 of a small reversible electric motor, the stator or field of which is indicated diagrammatically in Fig. 9 by the numeral 79.

For controlling the rotation of the motor in one direction, I provide a pair of electromagnets 80—81 and for controlling the rotation of the motor in the opposite direction, I provide a pair of electromagnets 80'—81'. The magnets 80 and 81 are connected by a wire 82 and the magnets 80'—81' are connected by a wire 82'. The magnets 81 and 81' are connected by a wire 83—83' to one side of a battery 84 or other source of electrical energy and the other side of said battery is grounded through the scale beam 33 by a wire 85. When the scale beam 83 is moved upward, its projecting end 33' will engage with an upper contact 86, and when said scale beam is moved downward, said projecting end will engage with a lower contact 86'. The contact 86 is connected to the magnet 80 by a wire 87 and the contact 86' is connected to the magnet 80' by a wire 87'. The upwardly projecting cores of the magnets 80, 81, 80' and 81' serve as contacts for the motor-controlling circuits but not for the said magnets themselves. Yieldingly retracted armature-equipped contacts 88 and 89 cooperate, respectively, with the projecting cores of the magnets 80 and 81, and similar yieldingly retracted contacts 88' and 89' cooperate, respectively, with the projecting cores of the magnets 80' and 81'. The projecting cores of the magnets 81 and 81' are connected by a wire 90. The supply leads for supplying current to the motor are indicated by the numerals 91 and 92. The lead 91 is connected to one terminal of the field coil 79 and the other terminal of said field is connected by a wire 93 to the core of the magnet 80. The movable contact 88 is connected by a wire 94 to one terminal of the armature or rotor of the coil 78 and the other terminal of said coil is connected by a wire 95 to the core of the magnet 81. The movable contact 89 is connected by a wire 96 to one of two circuit-breaking contact brushes 97 and 98, the latter of which is connected to the supply lead 92. The two contact brushes 97 and 98 are insulated from each other but normally have contact with a nearly annular contact strip 99 that is carried by the worm gear 75 and is formed with a gap 100, for a purpose which will hereinafter appear.

The movable contact 88' is connected by a wire 94' to a wire 96 and the movable contact 89' is connected by a wire 95' to the wire 93. The projecting core of the magnet 80' is connected by a wire 93' to the wire 94.

The circuit between the contacts 97 and 98 will always be closed, except when the gate is moved to one extreme position, at which time the gap 100 will break the circuit and throw the motor out of action. When the flow of grain or material is that for which the weight on the scale beam 33 is set, the lever end 33' will be out of engagement with both contacts 86 and 86' and, at that time, all of the electromagnets 80, 81, 80' and 81' will be deenergized and the movable contacts 88 and 89, 88' and 89' will be retracted and, consequently, the motor circuit will be opened and the motor will stand idle and, of course, the gate will then remain where it is set.

When the flow of material is slightly less than the predetermined desired flow, the scale beam 33 will move upward, carrying its end 33' into engagement with the contact 86, and this will close the circuit through the magnets 80 and 81. When the magnets 80 and 81 are energized, they will draw downward the contacts 88 and 89 and then the motor will be rotated in the one direction, by the supply circuit then taking the following course, to wit: from the lead 91 through the field 79, wire 93, contact 88, wire 94, field 78, wire 95, contact 89, wire 96, contact 97, contact strip 99, and contact 98 to the supply lead 92. This, as is evident, will cause the motor armature to rotate in a direction, which we will assume to be in an anti-clockwise direction in respect to Fig. 9, and this will lower or open the gate, thereby increasing the flow.

When the flow of grain or material exceeds the predetermined flow for which the weight 34 on the scale beam is set, then the scale beam will move downward, causing its end 33' to engage the contact 86', and this will cause the current to flow through the motor armature in a reverse direction through the following connections, to wit: from the supply lead 91 through the field 79, wire 95', contact 89', wire 90, wire 95, armature 78, wire 94, wire 93', contact 88', wire 94', wire 96, contact 97, contact strip 99, and contact 98 to the other supply lead 92; and this, as is evident, will cause the operation of the motor to raise the gate and decrease the flow. Thus, by this electrical device, the operation of the gate to regulate the flow will be automatically maintained.

What I claim is:

1. An automatic feed regulator comprising feed-controlling mechanism, a flow-actuated device for controlling said feed-controlling mechanism, and a power device that derives its force from a source independent of the flow of material through said regulator and which furnishes power for actually adjusting said feed-controlling mechanism.

2. A feed regulator comprising a hopper, a discharge gate therefor, a flow-actuated device for controlling movements of said gate, and a power device that derives its force from a source independent of the flow of material through said regulator and which furnishes power for actually adjusting said gate.

3. The structure defined in claim 2 in which said hopper and gate are arranged for flow of the material over said gate along the angle of repose of the material, and a flow-actuated gate-controlling device.

4. The structure defined in claim 2 in which said hopper and gate are arranged for flow of the material over said gate along the angle of repose of the material, a flow-actuated gate-controlling device, and a power device that derives its force from a source independent of the flow of material through said regulator and which furnishes power for actually adjusting said gate.

5. An automatic feed regulator comprising a flow-actuated feed-controlling mechanism including a scale beam having means for adjusting its weight to vary the quantity of the feed flow, and a power device that derives its force from a source independent of the feed flow and which furnishes power to actually adjust said gate.

6. The structure defined in claim 5 in which said scale beam has an adjustable weight for varying its effective weight in the regulating action.

7. The structure defined in claim 5 in which the gate-actuating mechanism includes a device for reversing the action thereof.

8. A feed regulator comprising a hopper, a discharge gate therefor, a flow-actuated reversible gate-actuating mechanism including a scale beam having an adjustable weight and provided with stop devices for reversing said gate-actuating mechanism, said stop devices being positioned so that both stop devices will be out of action when the flow of material is that predetermined by the setting of said weight on said scale beam.

9. A feed regulator comprising a hopper, a discharge gate therefor, a power device that derives its force from a source independent of the flow of material through said regulator and which furnishes power for adjusting said gate, and a flow-actuated device controlling the power of said power device and for directing the application of the force thereof to adjust said gate.

10. The structure defined in claim 9 in which said flow-actuated device includes a motion-reversing device.

11. The structure defined in claim 9 in which said flow-actuated device includes a motion-reversing device, and in further combination with means for varying the action of the mechanism defined therein to set the same for different predetermined feeding actions.

12. An automatic feed regulator comprising a hopper, a discharge gate therefor; a reversible power-operated gate-actuating mechanism comprising a ratchet wheel, and an oscillatory dog carrier equipped with reversely acting dogs operative on said ratchet wheel; an impact plate movable in the path of discharge of said hopper; a counterweighted scale beam connected to and moved by said impact plate; and a gate-actuator reversing-device comprising a notched dog-reversing segment frictionally connected for oscillatory movements with said dog carrier and having a projecting escapement arm, and spaced escapement devices movable with said impact plate and scale beam and operative on said arm.

13. An automatic feed regulator comprising a hopper, a discharge gate therefor; a reversible power-operated gate-actuating mechanism comprising a ratchet wheel, and an oscillatory dog carrier equipped with reversely acting dogs operative on said ratchet wheel; an impact plate movable in the path of discharge of said hopper; a counterweighted scale beam connected to and moved by said impact plate; and a gate-actuator reversing-device comprising a notched dog-reversing segment frictionally connected for oscillatory movements with said dog carrier and having a projecting escapement arm, and escapement stops carried by said scale beam and operative on said arm to cause said segment to reverse the action of said dogs.

14. The combination with a hopper having at its discharge side a predetermined angle of repose for the material therein contained, a gate movable at the discharge side of said hopper from a position below upward toward such angle of repose, a counterweighted impact plate in the path of discharge from said hopper, a scale beam connected to and moved by said impact plate and having means for adjusting its weight, a power-operated gate-actuating mechanism including a ratchet wheel, an oscillatory dog carrier equipped with reversely acting dogs, a dog-releasing member frictionally connected for oscillatory movements with said dog carrier but shiftable in respect thereto to alternate and reverse the action of said dogs, said dog-releasing member having a projecting arm, and spaced escapement stops carried by said scale beam and operative on said arm to reverse the action of said gate-actuating mechanism.

15. The structure defined in claim 12 in which said escapement devices are spaced so as to clear said escapement arm when the feed from the hopper is correct as predetermined by the adjustment of said scale beam.

16. The structure defined in claim 14 in which said escapement stops are spaced so as to clear said escapement arm when the feed from the hopper is correct as predetermined by the weight adjustment of said scale beam.

17. A feed regulator comprising a hopper, a discharge gate therefor, a power-actuated flow-controlled reversible gate-actuating mechanism including a scale beam having means for adjusting its weight to vary the quantity of the feed flow, and automatic reversing means for reversing the gate-actuating mechanism, the said devices being positioned so that said reversing means will be out of action when the flow of material is that predetermined by the setting of said scale beam.

18. A feed regulator comprising a hopper, a discharge gate therefor, a power-actuated impact-controlled reversible gate-actuating mechanism including a scale beam having an adjustable weight and provided with stop devices for reversing said gate-actuating mechanism, the said stops being positioned so that both stops will be out of action when the flow of material is that predetermined by the setting of said weight on said scale beam.

19. The structure defined in claim 17 in further combination with means for automatically throwing the gate-actuating mechanism out of action following each gate-adjusting movement.

20. The structure defined in claim 18 in further combination with means for automatically throwing the gate-actuating mechanism out of action, following each gate-adjusting movement.

21. An automatic feed regulator comprising a hopper, a discharge gate thereof, a reversible power-operated gate-actuating mechanism, an impact plate movable in the path of discharge from said hopper, a counterweighted scale beam connected to and moved by said impact plate, a gate-actuated reversing device, one element of which is carried by said scale beam, and means for automatically setting said gate actuator reversing device in neutral position to thereby throw the gate-actuating mechanism out of action immediately following each gate-adjusting movement.

22. The structure defined in claim 17 in further combination with an alarm device operatively associated with said gate, and means timed in respect to said gate for automatically rendering said alarm device operative when said gate has been moved to an extreme open position.

23. In a feed regulator, the combination with a gate, of a power-operated gate-actuating device, flow-controlled means for regulating the action of said power device to adjust said gate, and means for rendering said power device inoperative on said gate when the gate has been moved to an extreme position.

In testimony whereof I affix my signature.

CLARENCE W. CARTER.